C. H. LYDAMORE & G. J. BOLA.
SNOW TRAVELING ATTACHMENT FOR MOTOR CYCLES.
APPLICATION FILED JAN. 29, 1916.

1,220,247.

Patented Mar. 27, 1917.

Inventor
C. H. Lydamore
G. J. Bola

By Watson E. Coleman
Attorney

CLARENCE H. LYDAMORE AND GEORGE J. BOLA, OF LAKE PLACID, NEW YORK.

SNOW-TRAVELING ATTACHMENT FOR MOTOR-CYCLES.

1,220,247.

Specification of Letters Patent. Patented Mar. 27, 1917.

Application filed January 29, 1916. Serial No. 75,133.

*To all whom it may concern:*

Be it known that we, CLARENCE H. LYDAMORE and GEORGE J. BOLA, citizens of the United States, residing at Lake Placid, in the county of Essex and State of New York, have invented certain new and useful Improvements in Snow-Traveling Attachments for Motor-Cycles, of which the following is a specification, reference being had to the accompanying drawings.

This invention relates to motorcycles, and particularly to an attachment whereby the motorcycle may be used for traveling over snow roads.

The general object of the invention is to provide a very simple, cheap, easily applied and easily detachable attachment, which when disposed upon a motorcycle will permit the machine to travel over ice and snow, and a further object is to so form the attachment that it may be used with or without a carriage body.

This invention is illustrated in the accompanying drawings, wherein.

Figure 1:
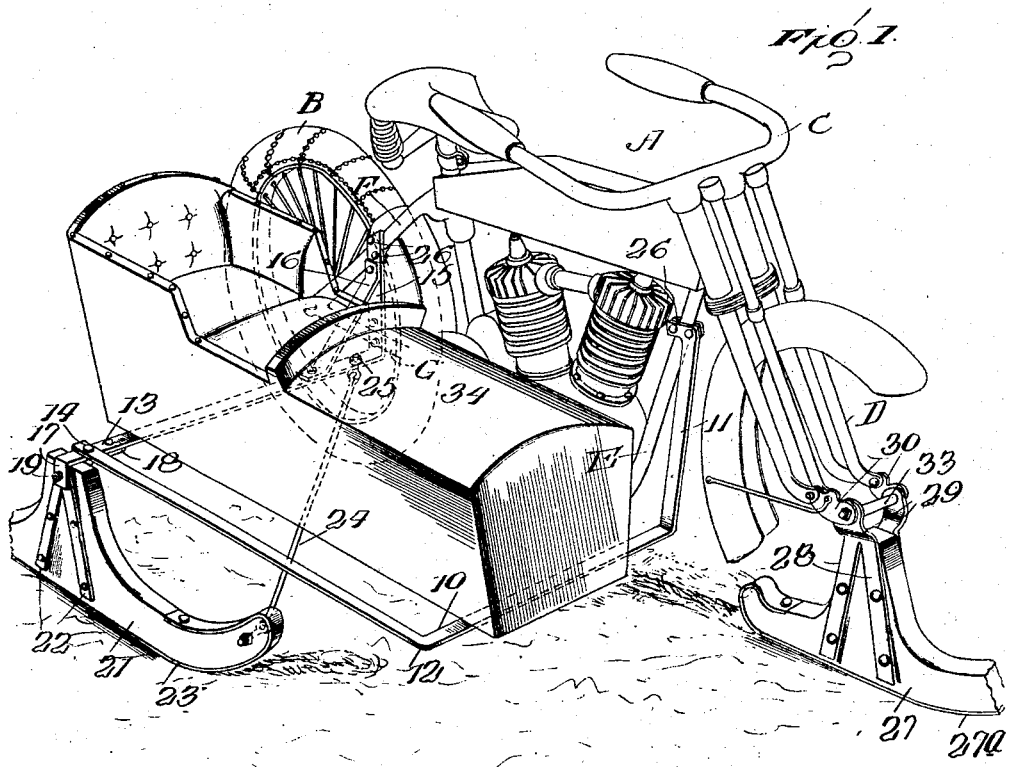
Figure 1 is a perspective view of a motorcycle with our attachment applied thereto.
Figure 2:
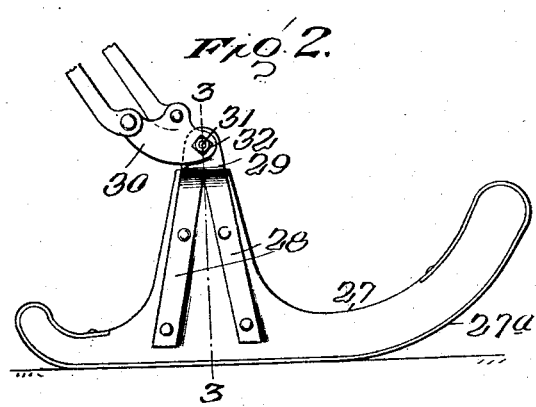
Fig. 2 is a side elevation of the front runner.
Figure 3:
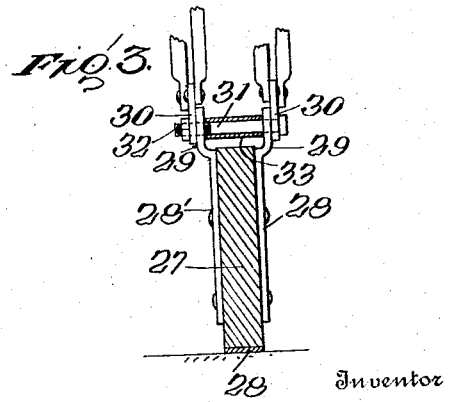
Fig. 3 is a section on the line 3—3 of Fig. 2.

Referring to these drawings, A designates a motorcycle of any usual or approved construction having the rear traction wheel B and the forward handle bar C terminating in forks D. This motorcycle is to be provided with the usual engine whereby the rear traction wheel B is driven. When traveling over snow roads this rear traction wheel is used in connection with a chain or other means whereby it may have tractive engagement with ice or snow. Save for the substitution of a front runner for the front wheel of the motorcycle and for the attachment thereto of the lateral runner, the motorcycle is not changed in any respect, and operates in precisely the same manner as motorcycles do when driven over ordinary roads.

Our attachment comprises a frame consisting of a front transversely extending bar 10, the inner end, that is, the end toward the motorcycle being extended upward as at 11 and provided at its upper end with means whereby it may be engaged with one of the supporting frame bars E of the machine. At its outer end the bar 10 is rearwardly bent as at 12, and the rear end is formed with a perforation for a bolt whereby it may be bolted to the rear transversely extending bar 13. The bolt is designated 14. The bar 13 at its inner end is upwardly bent as at 15 and is adapted for attachment to the frame bars F and G of the motorcycle, these bars extending rearward to engage with the rear traction wheel axle. The upper end of the upwardly bent portion 15 is connected to the body of the bar 13 by a downwardly and outwardly extending brace 16 which is riveted, bolted or otherwise attached thereto. The outer end of the bar 13 is extended beyond the bar 12 and is downwardly bent as at 17. To the under side of the bar 13 near its outer end is bolted the angle iron 18. Through the downwardly extending end 17 and the angle iron 18 passes a bolt 19 which in turn passes through a sleeve 20 carried upon the lateral runner 21. The runner is braced by upwardly converging metallic strips 22 through which the bolt 19 passes. These strips 22 are bolted at a plurality of points to the runner. The runner preferably curves upward at its forward and rear ends and is shod by a metallic strip 23 which extends the full length beneath the runner and over its forward and rear ends. The strips 22 are used upon both sides of the runner so as to thoroughly strengthen it, and the forward end of the runner is connected to the inner end of the bar 13 by means of a diagonally extending rod 24 which has a loop or hook at its end which engages with an eye bolt 25 mounted upon the inner end of the bar 13. This brace 24 holds the runner 23 in parallel relation to the traction wheel but permits the runner to oscillate in a vertical plane.

The frame above described is engaged with the frame of the motorcycle by means of U-bolts 26 which permit the ready attachment and detachment of the frame in its proper adjustment.

The front runner 27 is shod at 27ª and braced by the strips 28. These are downwardly deflected at 29 to fit the forks 30 of the motorcycle. The axle 31 connects the ears 29 to the forks and passes through a sleeve 33, there being nuts 32 on the ends of the axle 31.

Adapted to be disposed upon the frame formed by the members 10, 12 and 13 is a body or "boat" 34 which may be attached to the frame by bolts or other means or which may simply rest upon the frame. Preferably, however, it is bolted to the frame. This boat-shaped body is intended to be removed or replaced or put in place quickly and easily whenever desired.

The operation of the invention will be obvious from the above description. The motorcycle is driven exactly like any other motorcycle, and chains or other traction means mounted upon the rear traction wheel will propel the motorcycle in the same manner as if it were operating over an ordinary road. The lateral outrigger prevents any tipping of the motorcycle when running through even deep snow and at a slow speed, and is particularly desirable inasmuch as it is very difficult in snow to keep the motorcycle upright particularly when starting. It furthermore permits a load to be carried by the motorcycle and makes it of great convenience.

Having described the invention, what is claimed is:

1. An outrigger frame for motorcycles comprising forward and rear laterally extending bars attachable at their inner ends to the frame of a motorcycle, a connecting bar, a runner pivotally mounted upon said connecting bar for vertical oscillation, and a brace attached to the forward end of the runner and loosely connected to the inner end of the rear frame bar.

2. An outrigger frame for motorcycles comprising a forward bar having frame clamping means, said forward bar extending downward and laterally, a rear bar having clamps whereby it may be detachably connected to the rear portion of a motorcycle frame and extending downward and laterally, a longitudinally extending bar connecting said forward and rear bars, a runner pivotally supported upon the extremity of the rear bar for movement in a vertical plane, and a brace attached to the forward end of the runner and loosely connected to the lower end of the rear bar.

3. An outrigger frame for motorcycles having a front bar, the inner end of which is upwardly inclined and provided with a clamp, a rear bar angularly bent at its inner extremity and carrying a clamp, a connecting bar between the outer end of the first named bar and the outer end of the second named bar, the second named bar extending beyond said connecting bar and being downwardly bent at its extremity, an angle iron attached to said rear bar and extending downward parallel to the angular extremity, a runner disposed between the angle iron and the extremity and having upwardly extending braces, a pivot bolt passing through said braces, the angle iron and said extremity whereby to pivotally support the runner, and a brace connected to the end of the runner and loosely connected to the rear bar at its lower end.

In testimony whereof we hereunto affix our signatures in the presence of two witnesses.

C. H. LYDAMORE.
GEORGE J. BOLA.

Witnesses:
H. J. WOOD,
A H. STEVENS.

Copies of this patent may be obtained for five cents each, by addressing the "Commissioner of Patents, Washington, D. C."